March 18, 1969  
C. V. RUMBLE  
3,433,699  
PRESSURE APPLICATOR FOR BONDING AN
ARTICLE TO A THIN MATERIAL  
Filed Aug. 2, 1965

INVENTOR
CARL V. RUMBLE

BY

ATTORNEYS

United States Patent Office 3,433,699
Patented Mar. 18, 1969

3,433,699
PRESSURE APPLICATOR FOR BONDING AN ARTICLE TO A THIN MATERIAL
Carl V. Rumble, 6 Braemar Drive, Hampton, Va. 23369
Filed Aug. 2, 1965, Ser. No. 476,762
U.S. Cl. 156—580          13 Claims
Int. Cl. B32b 31/10

ABSTRACT OF THE DISCLOSURE

A pressure applicator utilized in securing strain gages to very thin metal. A plate-like member has a chamber formed therein and is otherwise vented to allow evacuation. An aperture is formed in the plate-like member and a piston slidably disposed therein. A flexible membrane covers the piston and a portion of the plate-like member. Upon evacuation atmospheric pressure causes the piston to exit pressure on a strain gage placed under the piston as the plate-like member supports the thin metal.

SPECIFICATION

Figure 1:
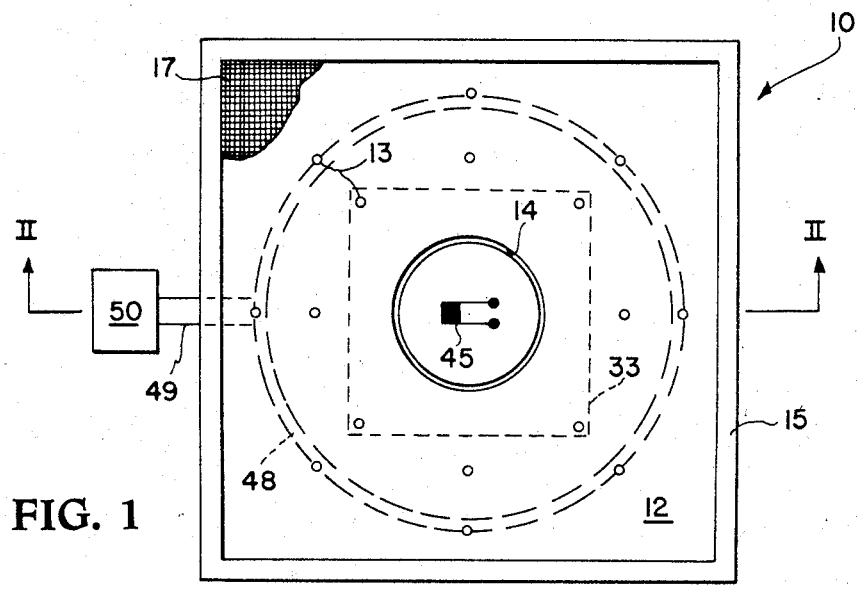

The invention described herein may be manufactured and used by or for the Government of the United States of America for governmental purposes without the payment of any royalties thereon or therefor.

This invention relates to a pressure applicator, and more particularly to a pressure applicator for attaching strain gages and the like without the aid of additional mechanical attachments.

The application or fixing of strain gages which may include foil, wire or similar items, to thin skinned material has proven difficult, particularly when related to various members used in the space environment. Prior art devices for accomplishing this task have included various types of mechanical clamps associated with jigs and fixtures constructed to apply a force against a calibrated spring arrangement which exerts the proper pressure to the strain gage during cement setup time. Although these devices are functional for most applications, it is apparent that setup time is excessive. Furthermore, it is expensive, since many of the jigs and fixtures, clamps and backup members must be specially made to fit a particular environment. Since much of this mechanism is used only one time, it is costly from the standpoint of merely making the jigs and fixtures as well as the expense of the material utilized for construction. Many times, it is difficult to work with this equipment since it is bulky and clumsy. Also, the equipment is not always trustworthy as to alinement and pressure application on the strain gage and body to which it is attached. Uneven application of the strain gage to the test body may result in erroneous measurements. When a strain gage is being attached to a thin skinned test body, there is often damage to the test body due to the uneven pressure application, resulting in costly repair to the test member. Often, a strain gage must be applied to members, such as a closed pressure vessel, where it is difficult and sometimes impossible to back up the test member or properly secure the jigs and fixtures in position.

The invention here under consideration, eliminates the difficulties inherent in the prior art techniques discussed above. These problems are overcome by providing a plate-like member having a surface which conforms to the surface of the test body. The plate has a chamber which has passages communicating with the surface, both of which are subject to evacuation. Upon evacuation, the plate adheres to the test body and is provided with sufficient area so as to back up the test body skin and give it adequate support regardless of the fragile nature of the test body. A portion of the plate is slidable and subjected to atmospheric pressure upon evacuation causing an area of pressure to be subjected against the test body. A strain gage is thus forced against the test body when placed under the movable portion of the pressure applicator.

It is therefore an object of this invention to provide a device for attaching strain gages and the like to a test body without the need for clamps, jigs and fixtures.

Still another object of this invention is to provide a device for applying pressure to strain gages and the like to be fixed to a test body utilizing an evacuation principle for holding the device to the test body, and atmospheric pressure for actuating the device to apply pressure to the strain gage.

Yet another object of the invention is to provide a device for attaching strain gages to a test body having very thin skin or membrane without rupture or strain thereof.

A further object of the invention is to provide a device for applying strain gages to a sealed tank or compartment which cannot be supported with backup structure.

An additional object of the invention is to provide a pressure applicator for strain gages or the like which is inexpensive to manufacture, is easy to set up and use, and is reusable for many additional applications.

An additional object of the invention is to provide a device for applying strain gages to a test body and the like wherein structural variations utilize standard atmosphere to apply different pressures.

Yet another further object of the invention is to provide a device for applying strain gages and the like to a test body which is easily calibrated for applying the correct pressure to the strain gage.

An added object of the invention is to provide a method for attaching strain gages to a test body.

Another object of the invention is to provide a device for applying strain gages to a test body which provides an equally distributed application of force against the strain gage and to the test body.

Still a further object of the invention is to provide a device for applying pressure to a strain gage and the like wherein the structure of the device is readily moldable and porous allowing evacuation therethrough.

These and other objects and advantages of the invention will become more apparent upon reading the specification in conjunction with the accompanying drawings.

Figure 2:
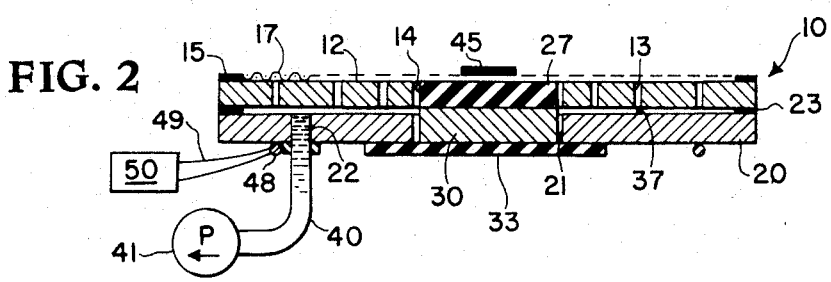
Figure 3:
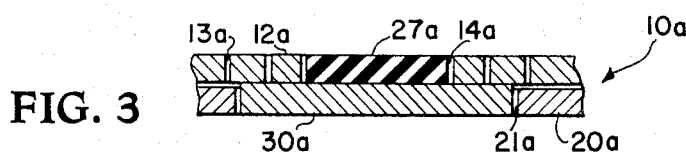
Figure 4:
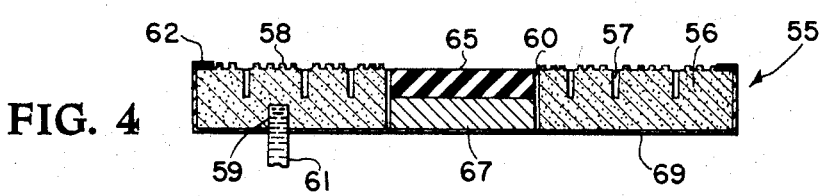

In the drawings:
FIG. 1 is a plan view of the pressure applicator;
FIG. 2 is a cross-sectional view taken along the section lines 2—2 of FIG. 1;
FIG. 3 is a cross-sectional view showing a modified pressure pad and block arrangement; and
FIG. 4 is a cross-sectional view showing another embodiment of the invention.

Basically, this invention consists of a method and apparatus for applying strain gages and the like to thin skinned material. One embodiment of the invention includes a faceplate having a surface conforming to the surface to which the strain gage is to be applied. This surface is properly vented for evacuation. A backplate is sealed to the faceplate forming a low pressure chamber connecting the vents and a vacuum line communicating with the chamber. An aperture or cylinder is formed through the face and backplates and receives a block which is slidable therein. The block has a cushioned face which engages the strain gage to be forced against an adjacent body. A flexible member is positioned over the cylinder and block sealing the low pressure chamber. The block transmits the force of the atmospheric pressure against the strain gage being installed. A seal around the edge of the faceplate perimeter completes a vacuum chamber when the applicator is placed against the surface being installed with a strain gage.

Referring now more specifically to the details of the invention, FIG. 1 shows the pressure applicator designated generally by the reference numeral 10. The applicator includes a faceplate 12 (FIG. 2) which is of a sufficient thickness to adequately support a thin skinned or membrane-like material and of sufficient surface area to prevent straining or stretching the material to which the strain gage is to be attached. The face of plate 12 is shown as a flat member; however, it is to be understood that it may take various configurations, such as a curved surface enabling it to conform to various test body configurations. A screen grid or other network of passages 17 overlie or are formed in the face of the faceplate 12 to insure rapid evacuation of the face area. A centrally located aperture 14 is formed through the faceplate 12 to receive a pressure applicator block to be explained more fully hereinafter. Depending on the application, the aperture may or may not be centered. A face seal strip 15 is fixed to and about the outer periphery of the faceplate as shown in FIGS. 1 and 2. The seal is constructed from conventional material such as rubber or some type of flexible plastic.

The faceplate 12 may be constructed from various types of material such as metal, plastic and mortar materials. A faceplate of material such as plaster of Paris is particularly adaptable since it is economical, can be readily molded to any configuration, and is porous enough that a vacuum can be drawn through the material by merely sealing the exposed edges. Also the passage network to the vents may be easily molded in the face of the faceplate.

Backplate 20 of generally the same size and configuration as the faceplate 12, is fixed to and spaced from the faceplate 12 by seal strip 23. The seal strip 23 is located about the peripheries of the face and backplates. The spacing of the plates provides a chamber 37 between the plates which communicate with the surface of the faceplate via the ports or vents 13. The backplate also has an aperture 21 which is alined with the aperture 14 of the faceplate. The aperture 21 may be of the same dimension, greater or smaller, and serves the same purpose as the aperture 14. A vacuum line receptable 22 is formed in the backplate and is adapted to receive the vacuum line 40 which is threaded therein. A lock nut may be utilized with the vacuum line to fix it with respect to the backplate. The vacuum line 40 communicates with the vacuum chamber 37. A vacuum pump 41 (shown diagrammatically) of conventional design is connected to the vacuum line 40.

A pressure block or piston 30 is located in the cylinder or working area (it need not be cylindrical) formed as a result of the combined apertures 14 and 21 formed through the face and backplates 12 and 20, respectively. The pressure block 30 is covered with a resilient pressure pad 27 which is fixed thereto. Under certain circumstances, the face of the pad has the same formation as the face of the faceplate and when a screen is utilized, it normally covers the pressure pad. A strain gage 45 rests on the pressure pad screen, as the case may be, as shown in FIGS. 1 and 2. The combined pressure block and pressure pad are approximately the same thickness as the joined face and backplates. These members are dimensionally slightly smaller than the cylinder formed in the face and backplates allowing freedom of movement in the cylinder, as well as forming an area thereabout to allow air to bleed from the surface to the chamber formed between the face and backplates.

A flexible member, diaphragm 33, tape or other material covers the pressure block and cylinder formed in the face and backplates. The flexible member 33 may be hinged at one edge or may be merely laid on the backplate during the pressure applicator operation.

In certain applications of a strain gage to a test body, it is necessary to cure the cement used in the process with heat. Under these circumstances the face and backplates are constructed of a heat-conducting material to which is attached the heating element 48 (of conventional design). The element is connected to a power supply 50 by conduits 49 also of conventional design.

A modification of the invention is shown in FIG. 3, a portion of the center of a pressure applicator being shown and designated generally by the reference numeral 10a. This pressure applicator has a faceplate 12a with vents 13a. An aperture 14a is formed through the faceplate all of this structure being similar to the pressure applicator 10. A backplate 20a is also similar in construction to the backplate 20 but has an enlarged aperture 21a. A pressure pad 27a is operative in the aperture 14a and a pressure block 30a in the aperture 21a. It should be noted that the pressure block 30a is approximately twice the size of the pressure pad 27a. This provides an arrangement whereby atmospheric pressure subjected against the pressure block 30a causes an exertion of pressure by the pressure pad 27a which is a multiple of the atmospheric pressure. It is apparent that this technique may be reversed, in that the aperture 14a would be larger than the aperture 21a and the pressure pad 27a and 30a would then be designed accordingly, thus providing a device wherein the pressure applied by the pressure pad 27a to the strain gage is less than atmospheric pressure.

Another embodiment of the invention is shown in FIG. 4 and designated generally by the reference numeral 55. This pressure applicator has a body 56 which is constructed from a material that is moldable and porous, such as plaster of Paris. With a porous body, there is no need for an evacuation chamber since air can be drawn through the body itself. To help accomplish rapid evacuation, however, vents 57 may be formed in the material at intervals thereabout. The face of the body 12 is provided with a network of passages 58 to insure simultaneous withdrawal of air from all points on the surface to the vents 57. The body 56 is provided with an aperture 59 which receives an evacuation line 61. An aperture 60 is formed through the body 56 to receive a pressure pad 65 and block 67 in the same manner as the FIG. 1 arrangement. Since the body 56 is porous, it must be sealed with some type of material. It has been found that a flexible plastic tape 69 may be used for this purpose, which could as well operate as the flexible member or diaphragm for covering aperture 60 and pressure block 67. A seal strip 62 surrounds the periphery of the body face to facilitate effecting a vacuum as in previous embodiments.

OPERATION

The operation of the pressure applicator 10 and the method of fixing the strain gage 45 to a member is believed to be apparent from the above description; however, for purposes of clarity, it will be explained in detail. A thin coat of adhesive is applied to the test body, skin, membrane or other member to which the strain gage is to be applied. The strain gage is then placed gently on the adhesive. The pressure applicator 10 is located over the strain gage with the aperture 14 centered with respect to the strain gage. The pressure block 30 is readily removed so that it is easy to locate the applicator with respect to the strain gage. The pressure block 30 is then replaced in the cylinder formed by the apertures 14 and 21 with the pressure pad 27 engaging the strain gage. The flexible member 33 is placed on the backplate 20 such that the cylinder and pressure block are completely covered and portions of the flexible member overlap onto the backplate. The pressure applicator 10 is held in position during this operation by the hand of the operator or with a simple clamp arrangement until the vacuum pump 41 can be energized. As the chamber 37 is evacuated, the air about the faceplate surface is drawn through the network 17 to the vents 13 and a seal is effected about the seal strip 15. As the evacuation process continues the atmospheric pressure will cause the pressure applicator 10 to be forced against the test body or skin causing the device to adhere to the test body. The operator can then release his hold on the pressure applicator and the temporary clamp used to initially position the applicator may be removed.

Since the pressure block 30 is free to move with respect to the face and backplates, and since the member 33 is flexible, the atmospheric pressure acting against the block causes it force or bear against the strain gage and the test body. Thus, as long as evacuation continues, pressure is brought to bear against the strain gage necessary for the installation process.

Depending on the type of adhesive utilized, the power supply 50 may be activated causing the heater element 48 to operate. Since the device is made of a heat conducting material, heat will flow to all areas of the pressure applicator and also to the material to which the strain gage is being attached.

From the above description of the invention the many advantages thereof are believed to be clear. Obviously, no jigs or fixtures, clamps, etc., are necessary to maintain the pressure applicator in position during its operation. The device can be utilized with almost any configuration of test body, the only alteration necessary being the configuration of the faceplate. The design of the pressure applicator is simple, facilitating ease and economy of manufacture. Since there are no moving parts, it is simple to maintain providing for repeated use both from the maintenance standpoint and adaptability to various strain gage applications. Adaptability is further enhanced by an applicator which is constructed from plaster of Paris or the like since it is readily moldable to almost any configuration. Also, this type of material can be used as a faceplate in conjunction with a metallic or plastic backplate. Since atmospheric pressure is extremely uniform in the environments to which the pressure applicator device is subjected, a similar pressure is directed against the pressure block and thus the strain gage which is being installed. It is also a simple matter to calibrate or determine the pressure which will be applied by the pressure block to the strain gage merely by regulating the extent of evacuation. Thus, the device is versatile in the degree of pressure application. In view of the evacuation technique utilized, the test body to which the strain gage is to be attached is forced against the pressure applicator as well as the applicator being forced against the test structure. The very uniform pressure is applied to all areas of the test body subjected to the attachment process since the network of passages on the surface of the faceplate assures equally distributed and simultaneous areas of evacuation at all points on the surface virtually eliminating the development of pressure spots and straining of the test body skin. This feature is extremely important in certain thin skinned test bodies since a weak spot produced in the skin due to strain gage application may result in having to replace the entire test body structure. This can be very time-consuming and costly in many structures utilized in the space environment. Obviously, the chance of obtaining a true reading from the strain gage is enhanced when the strain gage is installed without distortion of the strain gage itself or the test body surface. The device provides great advantages for applying a strain gage to a closed tank-like structure, since no backup structure is necessary to support the installation.

While a preferred embodiment of this invention has been described, it will be understood that modifications and improvements may be made thereto. Such of these modifications and improvements as incorporate the principles of this invention are to be considered as included in the hereinafter appended claims unless these claims by their language state otherwise.

What is claimed as new and desired to be secured by Letters Patent of the United States is:

1. A pressure applicator comprising: a member having a surface adapted to conform to a surface against which pressure is to be applied; vents formed through the member; a backup plate sealed to and spaced from said member forming a chamber; an aperture through said member and backup plate; slidable means in said aperture; flexible means for covering said aperture and engaging said slidable means; and means for evacuating said chamber when said applicator engages a surface against which pressure is to be applied whereby atmospheric pressure acts on said slidable means.

2. A pressure applicator for strain gages comprising: a faceplate; ports formed through said faceplate; a seal fixed to said faceplate about the periphery; a backplate; another seal fixed to said faceplate and to said backplate and spacing members forming a chamber; an aperture formed through said faceplate and backplate; a member slidable in said aperture and having a padded surface; a flexible member sealing said aperture and engaging said slidable member; and means for evacuating said chamber whereby atmospheric pressure acts upon said flexible and slidable members causing a strain gage resting on said padded surface to be forced against an adjacent surface when said faceplate is placed thereagainst.

3. A pressure applicator for strain gages comprising: platelike means having a surface adapted to conform to a surface against which pressure is to be applied; chamber means formed in said first mentioned means and having passages communicating with said surface; slidable means associated with said first mentioned means adapted to bring a force to bear against said mating surface flexible membrane means covering said slidable means and at least a portion of said first mentioned means; means for evacuating said chamber means causing said surface to adhere to a mating surface and said slidable means to exert pressure against said mating surface due to atmospheric pressure.

4. A pressure applicator for strain gages comprising: plate means having a surface adapted to conform to a mating surface; means for sealing said plate means when engaging a mating surface; a chamber formed in said plate means and having vents comunicating with said plate means surface; a portion of said plate means being removed forming a working area; slidable means operable in said working area and having sufficient clearance with respect to said cylinders to provide fluid passage between said surface and said chamber; means for evacuating said chamber; and fflexible means for covering said working area and slidable means and sealing said plate means whereby atmospheric pressure acting on said flexible means forces said slidable means to bear against said mating surface.

5. A pressure applicator for strain gages as in claim 4 wherein said slidable means has a padded surface for bearing against said mating surface.

6. A pressure applicator for strain gages as in claim 4 wherein said plate means has a substantial surface area to provide adequate support to a thin material to which a strain gage may be applied.

7. A pressure applicator for strain gages as in claim 4 wherein an adhesive is applied to said mating surface for securing a strain gage and said plate means is constructed of a heat conducting material; and heater means associated with said plate means whereby said adhesive may be cured.

8. A pressure applicator for strain gages as in claim 4 wherein said plate means surface is covered with a screen providing a network of passages to said vents enabling simultaneous evacuation of all areas of said surface.

9. A pressure applicator for strain gages as in claim 4 wherein said slidable means has one portion subjected to atmospheric pressure which is larger than another portion whereby a pressure other than atmospheric is applied to said strain gage.

10. A pressure applicator for strain gages as in claim 4 wherein said plate means surface has a network of passages formed therein enabling simultaneous evacuation of all areas of said surface.

11. A pressure applicator for strain gages comprising: body means having a surface adapted to conform to a surface against which pressure is to be applied; said body means being constructed of a material allowing a vacuum to be drawn therethrough; means for sealing the exterior of said body means; means for evacuating said body means causing said surface to adhere to a mating surface; and slidable means associated with said body means influenced by atmospheric pressure to bring a force to bear against said mating surface.

12. A pressure applicator for strain gages as in claim 11 wherein said body means face has a network of passages molded therein to provide simultaneous evacuation of all surface areas.

13. A pressure applicator for strain gages as in claim 11 wherein said means for sealing said body means is a flexible tape also covering said slidable means transferring the atmospheric pressure to said mating surface.

References Cited

UNITED STATES PATENTS

| | | | |
|---|---|---|---|
| 2,423,842 | 7/1947 | McHenry | 338—2 X |
| 2,489,837 | 11/1949 | Von Hofe | 156—581 X |
| 2,621,276 | 12/1952 | Howland | 338—2 |
| 2,963,773 | 12/1960 | Starr | 338—2 X |
| 3,064,221 | 11/1962 | King | 73—88.5 X |
| 3,389,459 | 6/1968 | Russell | 338—2 X |
| 1,130,679 | 3/1915 | Staunton | 269—21 X |
| 2,311,525 | 2/1943 | Ebbs | 269—21 |
| 2,379,220 | 6/1945 | Englehart | 269—22 |
| 3,236,715 | 2/1966 | Gunderson | 156—285 X |
| 3,323,788 | 6/1967 | Roudier | 269—22 |
| 3,330,550 | 7/1967 | Brownlee | 269—22 |
| 3,330,714 | 7/1967 | Gunderson | 156—286 |

HAROLD ANSHER, *Primary Examiner.*

U.S. Cl. X.R.

73—88.5; 156—285, 312; 269—22; 338—2